US007990417B2

(12) United States Patent
Yamamoto

(10) Patent No.: US 7,990,417 B2
(45) Date of Patent: Aug. 2, 2011

(54) TARGETED OBJECT PURSUIT SYSTEM

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 1174 days.

(21) Appl. No.: 11/686,578

(22) Filed: Mar. 15, 2007

(65) Prior Publication Data

US 2008/0036861 A1  Feb. 14, 2008

(30) Foreign Application Priority Data

Mar. 16, 2006  (JP) .................................. 2006-072904

(51) Int. Cl.
*H04N 5/225* (2006.01)
(52) U.S. Cl. ........................................ 348/169; 348/143
(58) Field of Classification Search .................. 348/169, 348/143, 345, 352
See application file for complete search history.

(56) References Cited

U.S. PATENT DOCUMENTS

| 5,835,641 | A | * | 11/1998 | Sotoda et al. | 348/169 |
|---|---|---|---|---|---|
| 6,061,055 | A | * | 5/2000 | Marks | 348/169 |
| 6,072,642 | A | * | 6/2000 | Shirai | 359/823 |
| 6,507,366 | B1 | * | 1/2003 | Lee | 348/169 |
| 6,590,999 | B1 | * | 7/2003 | Comaniciu et al. | 348/416.1 |
| 2002/0039438 | A1 | * | 4/2002 | Mori et al. | 382/154 |
| 2004/0189804 | A1 | * | 9/2004 | Borden et al. | 348/169 |
| 2005/0134710 | A1 | * | 6/2005 | Nomura et al. | 348/240.99 |
| 2005/0270408 | A1 | * | 12/2005 | Kwon et al. | 348/345 |

FOREIGN PATENT DOCUMENTS

JP  6-303490  10/1994

OTHER PUBLICATIONS

U.S. Appl. No. 11/686,561 to Yamamoto, filed Mar. 15, 2007.
U.S. Appl. No. 11/689,664 to Yamamoto, filed Mar. 22, 2007.

* cited by examiner

*Primary Examiner* — Philip B Tran
(74) *Attorney, Agent, or Firm* — Greenblum & Bernstein, P.L.C.

(57) ABSTRACT

A targeted object pursuit system comprising a first setting block, a second setting block, a recognition block, a first determination block, a second determination block, and a re-designation block is provided. The first setting block initially designates a partial area as a pursuit area. The second setting block designates the areas displaced from the pursuit area as candidate areas. The recognition block extracts a standard image and candidate images. The first determination block determines in which general direction the targeted object moves is the first or second general direction. Based on the determination made by the first determination block, the second determination block determines in which of the first, second, third, or fourth detailed direction the targeted object has moved. The re-designation block re-designates a candidate area as the new pursuit area.

6 Claims, 19 Drawing Sheets

FIG. 14

| | 105 | 40 | 45 | 50 | |
|---|---|---|---|---|---|
| 55 | 40 | 25 | 25 | 80 | 20 | 12b
| 60 | 70 | 65 | 30 | 95 | 80 |
| 30 | 100 | 95 | 60 | 110 | 75 |
| 120 | 110 | 85 | 120 | 120 | 90 |
| 70 | 40 | 150 | 100 | | |

|   | 1 | 0 | 0 | 0 |   |
|---|---|---|---|---|---|
| 0 | 0 | 0 | 0 | 1 | 0 |
| 0 | 0 | 0 | 0 | 1 | 1 |
| 0 | 1 | 1 | 0 | 1 | 1 |
| 1 | 1 | 1 | 1 | 1 | 1 |
|   | 0 | 0 | 1 | 1 |   |

|   | 0 | 1 | 0 | 0 |   |
|---|---|---|---|---|---|
| 1 | 0 | 0 | 0 | 1 | 0 | 12b
| 0 | 1 | 0 | 1 | 1 | 1 |
| 0 | 1 | 1 | 0 | 0 | 1 |
| 0 | 1 | 1 | 0 | 1 | 0 |
|   | 1 | 1 | 1 | 1 |   | CA1

TARGETED OBJECT PURSUIT SYSTEM

BACKGROUND OF THE INVENTION

1. Field of the Invention

The present invention relates to a targeted object pursuit system that pursues the movement of a specified targeted object within a plurality of images captured sequentially.

2. Description of the Related Art

Image analysis to pursue the movement of a desired object within sequentially captured images is known. Such image analysis is used in an auto focus function to pursue a moving object. In addition, such image analysis is used by a monitor camera to pursue a specified person.

The image analysis in prior art is explained briefly below. First, a specified area within the frame of an image to be captured is initially designated as a pursuit area. Second, an image of the pursuit area captured at a certain point in time is compared to images of subsequently captured areas adjacent to the pursuit area, according to pattern matching. In pattern matching, multiple likeness values quantifying the similarity between two compared images are calculated, and area corresponding to the highest likeness value is designated as a new pursuit area. Since then, an object included in the pursuit area is pursued by repeating the above operation.

In the above pursuit method, the area corresponding to the highest likeness value is considered to be the area where the targeted object has moved. Accordingly, the image of such an area does not always accord to the image of the pursuit area.

The image analysis is adapted to the auto focus function by which an object moving within a captured image is brought into focus, as described above. In the image analysis, a hand shake may affect the calculation of a high likeness value irrespective of the similarity between two images. In addition, if the contrast between the images of the pursuit area and the compared areas is low, all likeness values may become too low to compare to one another. Consequently, it is problematic that a targeted object cannot be pursued accurately.

SUMMARY OF THE INVENTION

Therefore, an object of the present invention is to provide a targeted object pursuit system that purses the targeted object more accurately.

According to the present invention, a targeted object pursuit system, comprising a first setting block, a second setting block, a recognition block, a first determination block, a second determination block, and a re-designation block, is provided. The targeted object pursuit system pursues the movement or a targeted object within a plurality of sequentially captured images. The first setting block initially designates a partial area of a predetermined location in the captured image as a pursuit area. The pursuit area is used for pursuing the targeted object. The second setting block designates the areas displaced from the pursuit area in a first, second, third, and fourth detailed direction as a first, second, third, and fourth candidate area, respectively. The first and second detailed directions comprise a positive component of a first general direction. The third and fourth detailed directions comprise a positive component of a second general direction. The second general direction is different from the first general direction. The recognition block extracts a standard image from the image captured at a first point in time. The standard image corresponds to the pursuit area. The recognition block extracts a first, second, third, and fourth candidate image from the image captured at a second point in time. The first, second, third, and fourth candidate image correspond to the first, second, third, and fourth candidate areas, respectively. The second point in time is subsequent to the first point in time. The first determination block determines in which general direction the targeted object moves during the interval between the first and second point in time is the first or second general direction based on likeness values between the standard image and the first, second, third, and fourth candidate image. The likeness values between the standard image and first, second, third, and fourth candidate image vary according to how much the standard image accords to the first, second, third, and fourth image, respectively. The second determination block determines in which detailed direction the targeted object moves is the first or second detailed direction based on likeness values between the standard image and the first and second candidate image when the general direction where the targeted object moves is determined to be the first general direction by the first determination block. The second determination block determines in which detailed direction the targeted object moves is the third or fourth detailed direction based on likeness values between the standard image and the third and fourth candidate image when the general direction where the targeted object moves is determined to be the second general direction by the first determination block. The re-designation block re-designates a candidate area that corresponds to the detailed direction in which the targeted object moved as determined by the second determination block as the new pursuit area.

Further, the first determination block calculates the likeness value. The likeness value between the standard image and the first, second, third and fourth image corresponds to first, second, third, and fourth likeness value. The first determination block determines in which general direction the targeted object moves is the first or second general direction by comparing the sum of the first and second likeness values with the sum of the third and fourth likeness values.

Further, the second determination block calculates the likeness value. The likeness value between the standard image and the first, second, third and fourth image corresponds to first, second, third, and fourth likeness value. The second determination block determines in which detailed direction the targeted object moves is either the first or second detailed direction by comparing the first and second likeness values, or is the third or fourth detailed direction by comparing the third and fourth likeness values.

BRIEF DESCRIPTION OF THE DRAWINGS

The objects and advantages of the present invention will be better understood from the following description, with reference to the accompanying drawings in which:

FIG. 14 shows an example of luminance values of the pixel blocks included in the SA;

FIG. 15 shows binary luminance values of the pixel blocks described in FIG. 14;

FIG. 16 shows an example of binary luminance values of the pixel blocks included in the CA1;

DESCRIPTION OF THE PREFERRED EMBODIMENTS

Figure 1:
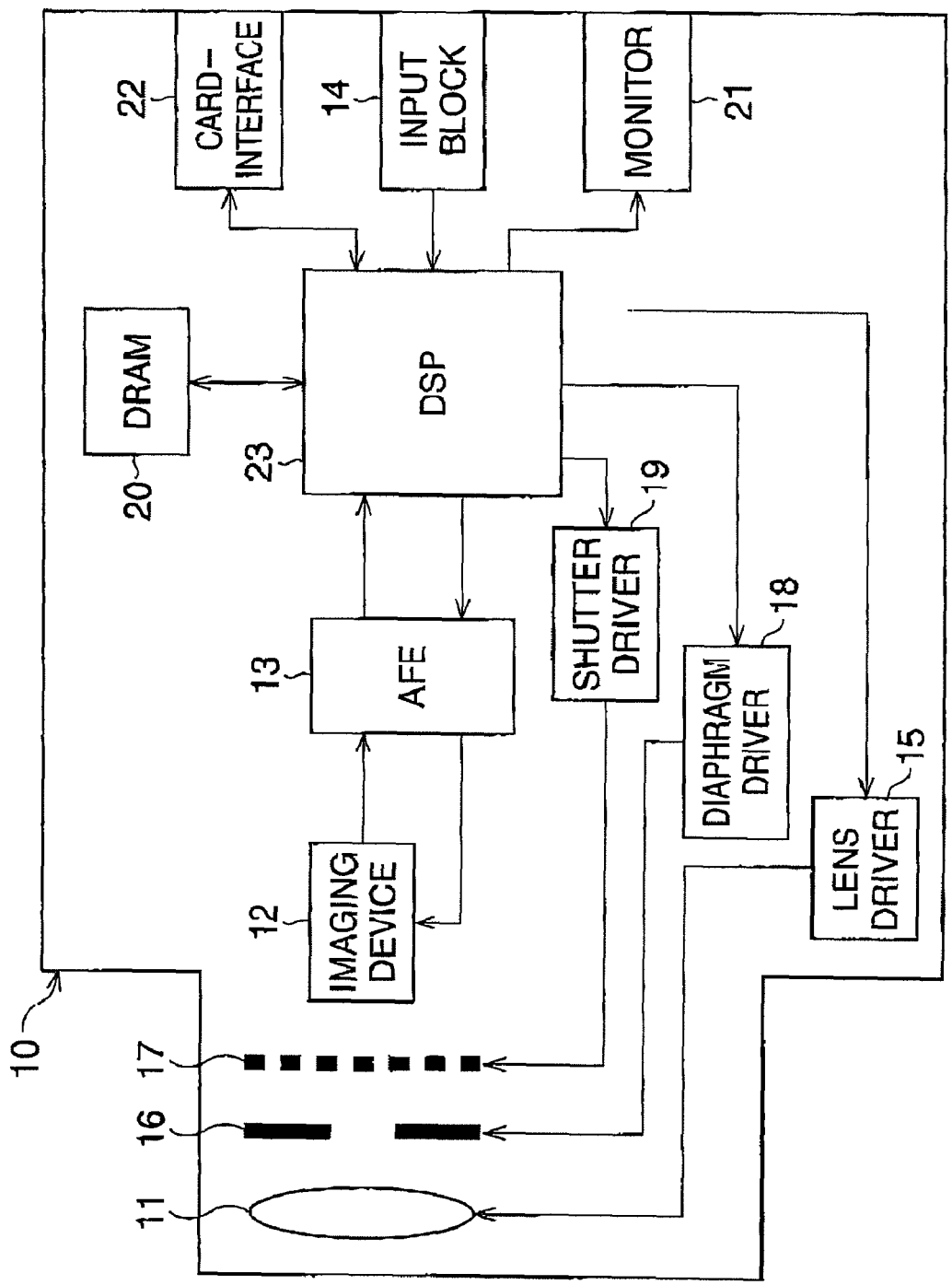
FIG. 1 is a block diagram showing the internal structure of a digital camera having a targeted object pursuit system of an embodiment of the present invention.

The present invention is described below with reference to the embodiment shown in the drawings.

In FIG. 1, a digital camera 10 comprises a photographic optical system 11, an imaging device 12, an analog front end (AFE) 13, a digital signal processor (DSP) 23, an input block 14, a lens driver 15, and other components.

The photographic optical system 11 is optically connected to the imaging device 12. An optical image of an object through the photographic optical system 11 is incident to the light-receiving surface of the imaging device 12. The imaging device 12 is, for example, a CCD area sensor. When the imaging device 12 captures the optical image of the object upon its light-receiving surface, the imaging device 12 generates an image signal corresponding to the captured optical image.

The photographic optical system 11 comprises plural lenses, including a zoom lens (not depicted) and a focus lens (not depicted). The positions of the zoom lens and the focus lens are adjustable along the optical axis of the photographic optical system 11. An optical image of an object can be focused on the light-receiving surface of the imaging device 12 by re-positioning the focus lens. The focal length of the photographic optical system 11 is adjusted by moving the zoom lens and the focus lens in relationship to each other.

The positions of the zoom lens and the focus lens can be manually adjusted along the optical axis by a user. In addition, the zoom lens and the focus lens can also be re-positioned by the lens-driver 15. Incidentally, the re-positioning of the focus lens for focus adjustments is automatically carried out when an auto focus function, as described later, is activated.

A diaphragm 16 and a shutter 17 are mounted between the photographic optical system 11 and the imaging device 12. The intensity of light made incident on the light-receiving surface of the imaging device 12 can be varied by adjusting the aperture ratio of the diaphragm 16. An optical image reaches the light-receiving surface by opening the shutter 17, and an optical image is shielded from the light-receiving surface by closing the shutter 17. A diaphragm-driver 18 drives the diaphragm 16 so that the aperture ratio can be adjusted. A shutter-driver 19 drives the shutter 17 so that the shutter can be opened and closed.

Incidentally, the lens-driver 15, the diaphragm-driver 18, and the shutter-driver 19 are all connected to the DSP 23, which controls the operations of the lens-driver 15, the diaphragm-driver 18, and the shutter-driver 19.

The imaging device 12 is electrically connected to the DSP 23 via the AFE 13. A clock signal is sent from the DSP 23 to the AFE 13, which generates a frame signal and an imaging device driving signal based on the received clock signal. The imaging device driving signal is sent to the imaging device 12. The imaging device 12 is driven based on the imaging device driving signal to generate an image signal that is synchronized with the frame signal.

Incidentally, pixels are arranged in a matrix on the light-receiving surface of the imaging device 12. For example, a pixel is each unit of area into which an effective receiving area, hereinafter referred to as an ERA, of the light-receiving surface is equally divided into n1 rows and n2 columns. Each pixel generates a pixel signal according to the intensity of light incident to the pixel. An image signal comprises a plurality of pixel signals generated by a plurality of pixels in the ERA.

The generated image signal is sent to the AFE 13, which carries out correlated double sampling and gain adjustment on the image signal. In addition, the image signal is converted into image data, which is digital data that is sent to the DSP 23.

The DSP 23 is connected to a dynamic random access memory (DRAM) 24, which is used as a work memory for signal processing carried out by the DSP 23. The image data received by the DSP 23 is temporarily stored in the DRAM 24. The DSP 23 carries out predetermined data processing on the image data stored in the DRAM 24.

The DSP 23 is connected to a monitor 21. The image data, having undergone predetermined signal processing, is sent to the monitor 21, which is able to display an image corresponding to the received image data.

The DSP 23 is connected to a card-interface 22 which can be connected to a memory card (not depicted). When a release operation is carried out, as described later, the image data, having undergone predetermined data processing, is stored in the memory card.

The DSP 23 is connected to the input block 14, where a user inputs operational commands. The input block 14 comprises a release button (not depicted), a multi-functional cross-key (not depicted), a power button (not depicted), and other buttons. The DSP 23 orders each component of the digital camera 10 to carry out a necessary operation according to a user's command input to the input block 14.

For example, by depressing the release button halfway, a first switch (not depicted) is switched on, and exposure and focus adjustments are then carried out. In the exposure adjustment, adjustment of the aperture ratio of the diaphragm 16, adjustment of shutter speed, and the gain adjustment of the image data by the DSP 23 are carried out. In the focus adjustment, the position of the focus lens is adjusted so that an optical image of the desired object can be focused on the light-receiving surface.

Further, by fully depressing the release button, a second switch (not depicted) is switched on, the shutter 17 is driven so as to open and close, and the imaging device 12 is driven so as to capture a static optical image.

Figure 2:
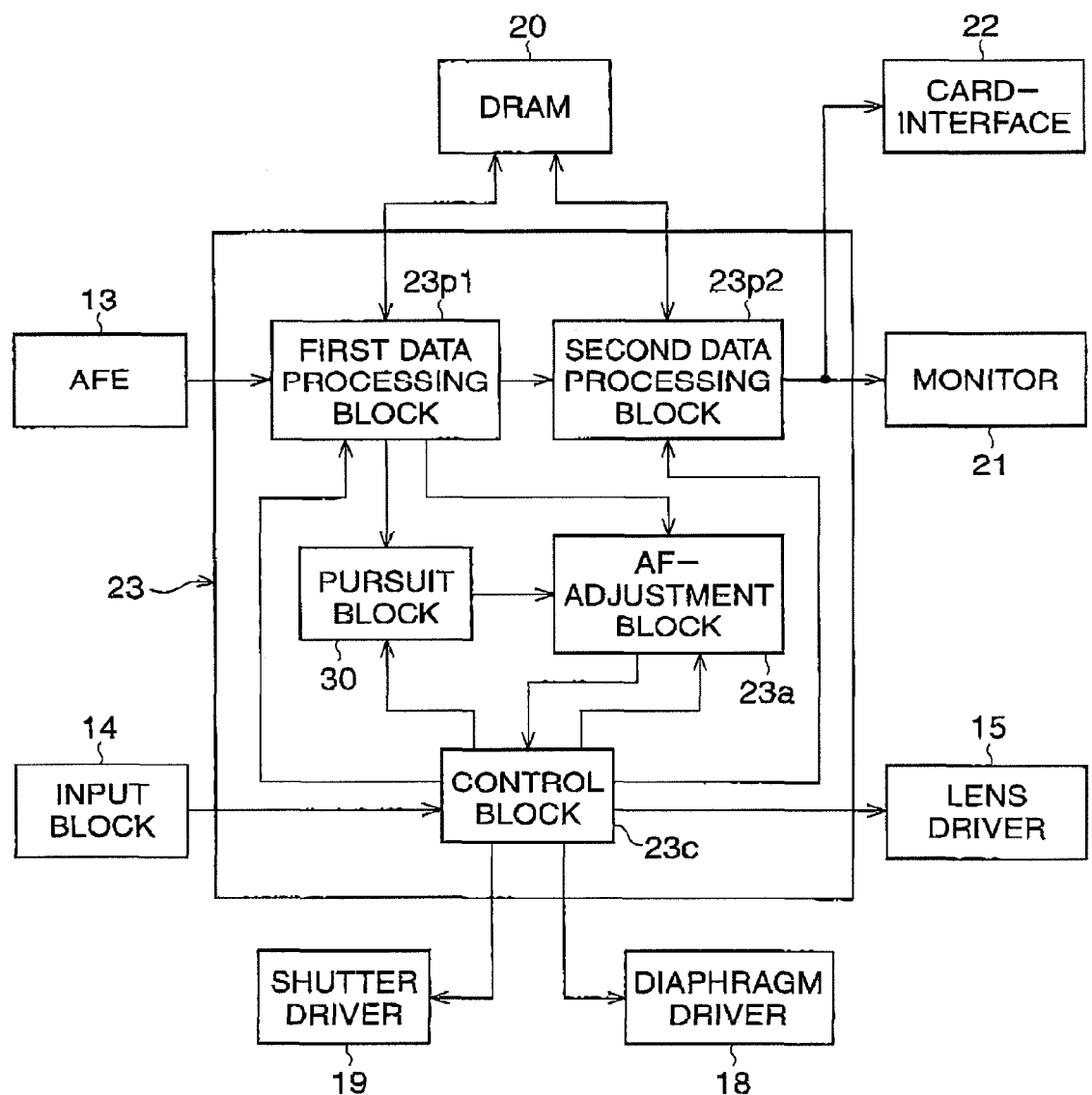
FIG. 2 is a block diagram showing the internal structure of the DSP.

Next, the internal structure of the DSP 23 is explained below, using FIG. 2. The DSP 23 comprises a first data processing block 23p1, a second data processing block 23p2, a pursuit block 30, an AF adjustment block 23a, and a control block 23c.

The image data output from the AFE 13 is input to the first data process block 23p1, which stores the received image data in the DRAM 20. In addition, the first data process block 23p1 carries out predetermined data processing, such as color interpolation processing, white balance processing, and luminance data generation processing on the stored image data. The first data process block 23p1 then sends the image data, after having undergone predetermined data processing, to the second data processing block 23p2.

The second data processing block 23p2 carries out predetermined data processing, such as cramp processing and blanking processing, on the received image data. Afterwards, the second data processing block 23p2 sends the image data to the monitor 21 or the memory card via the card-interface 22.

The first data processing block 23p1 also sends the image data to the pursuit block 30 and the AF adjustment block 23a. Based on the received image data, the pursuit block 30 and the AF adjustment block 23a determine, in cooperation with each other, the position of the focus lens so that a desired object is brought into focus on the light-receiving surface of the imaging device 12.

The pursuit block 30 designates one partial area of the entire captured image as a scanning area, hereinafter referred to as SA. The SA is used for capturing an optical image of an object that is desired to be in focus on the light-receiving surface. If the targeted object, which is an object desired to be in focus, moves within the captured image, the pursuit block 30 pursues the targeted object by sequentially re-designating a new partial area where the targeted object has moved, effectively updating the SA.

The AF adjustment block 23a determines the position of the focus lens so that an optical image captured by the SA is in focus. Incidentally, the position of the focus lens is determined according to the contrast detection method.

The digital camera 10 has both normal auto focus and pursuit auto focus functions. By carrying out the normal auto focus function, an object that is located in a fixed partial area of the entire captured image is brought into focus. By carrying out the pursuit auto focus function, an object that moves within the entire captured image is brought into focus. Either the normal auto focus function or the pursuit auto focus function is selected by an operational command input to the input block 14.

An input signal according to an operational command input to the input block 14 is sent from the input block 14 to the control block 23a. The control block 23c controls the first data processing block 23p1, the second data processing block 23p2, the pursuit block 30, the AF-adjustment block 23a, and each component of the digital camera 10 according to the received input signal.

For example, in the exposure adjustment the control block 23c controls both the diaphragm driver 18 to drive the diaphragm 16 and the shutter driver 19 to open and close the shutter 17.

Further, the control block 23c controls the lens-driver 15 to re-position the focus lens in the focus adjustment. In the focus adjustment, the control block 23c receives lens position data corresponding to the position of the focus lens determined by the AF-adjustment block 23a; the control block 23c controls the lens-driver 15 based on the received lens position data.

Figure 3:
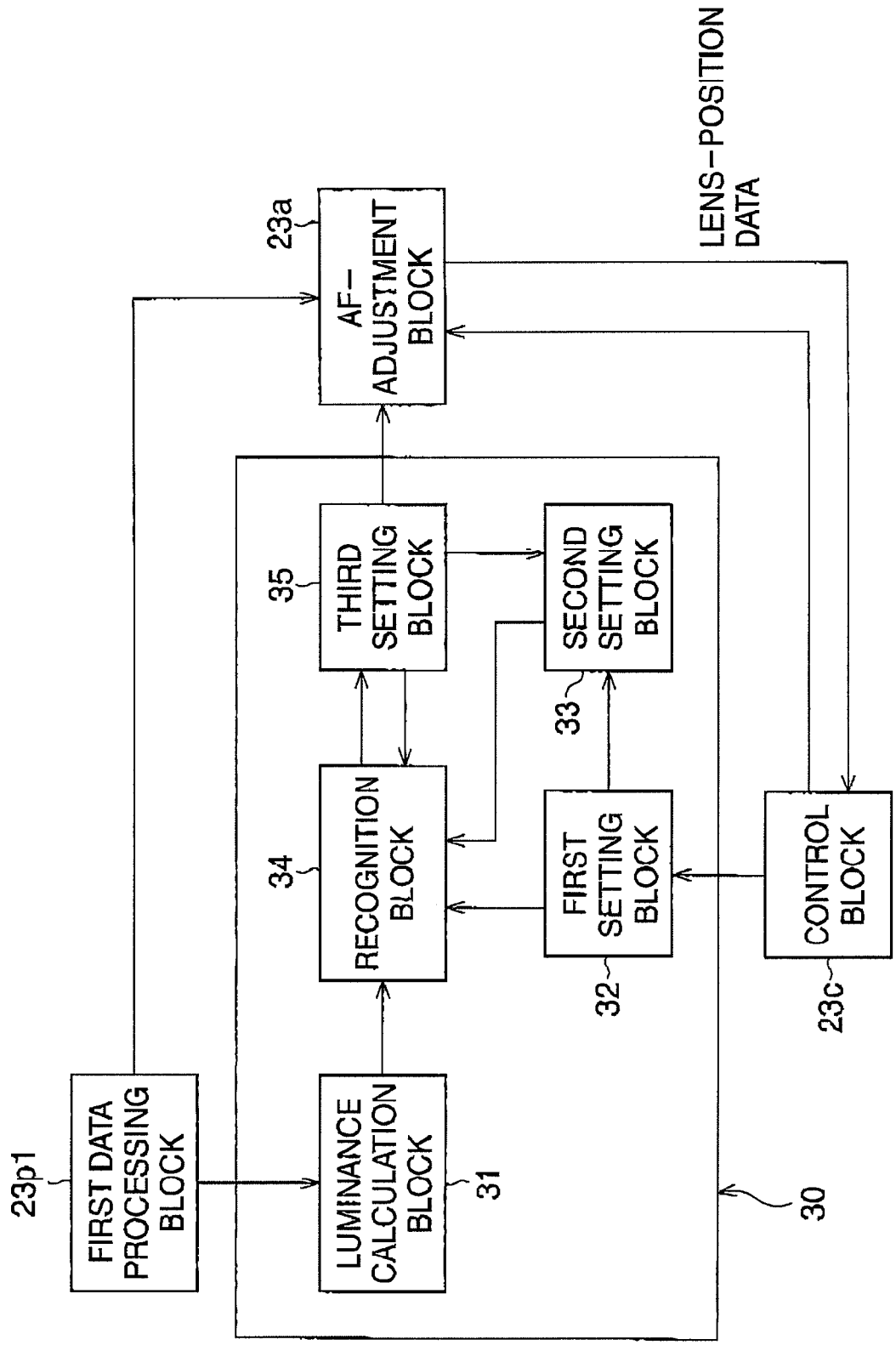
FIG. 3 is a block diagram showing the internal structure of the pursuit block.

Next, the structure and operation of the pursuit block 30 are explained in detail below, using FIGS. 3-5. The pursuit block 30 comprises a luminance calculation block 31, a first setting block 32, a second setting block 33, a recognition block 34, and a third setting block 35. Incidentally, each component is controlled by the control block 23c.

Luminance data for pixels within the ERA is sent from the first data processing block 23p1 to the luminance calculation block 31 when the pursuit auto focus function is carried out. The luminance calculation block 31 calculates the luminance of a pixel block 12b based on the received luminance data, for the purpose of minimizing the time of pursuit.

Figure 4:
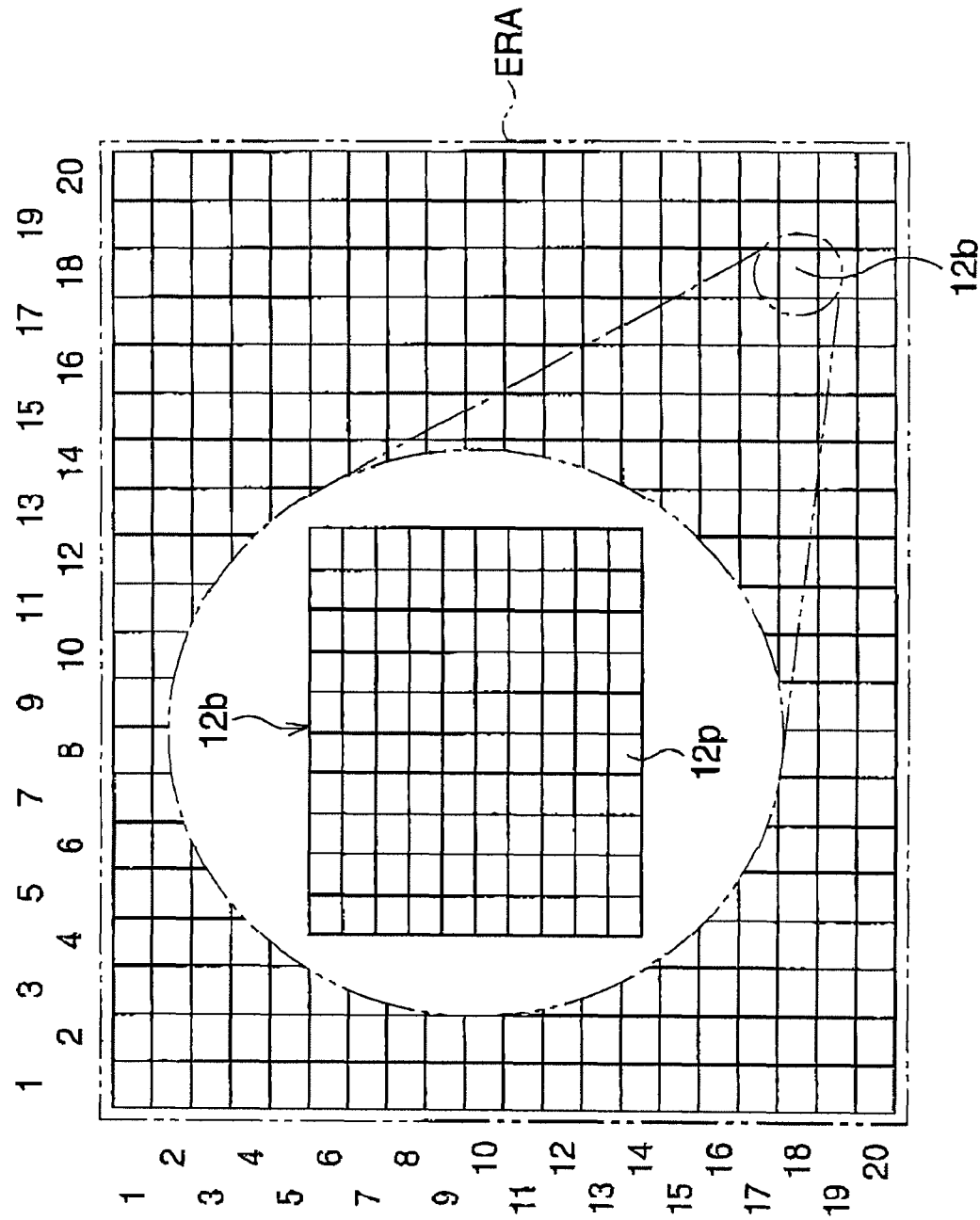
FIG. 4 shows the structure of the ERA of the imaging device.

As shown in FIG. 4, the pixel block 12b is a unit of area representing 1/400 of the ERA, which has been equally partitioned into twenty rows and twenty columns. The pixel block 12b is equally partitioned itself, so that the pixel block 12b comprises one hundred pixels arranged in a matrix of ten rows by ten columns. The luminance of the pixel block 12b is calculated by averaging the luminance of the 100 pixels included in the pixel block 12b. Data corresponding to the calculated luminance of the pixel block 12b is sent to the recognition block 34.

On carrying out the focusing adjustment, the first setting block 32 determines the location of the initial SA so that the centers of both the ERA of the imaging device 12 and the initial SA agree with each other. Designation of the initial SA is complete by determining the location of the initial SA.

Figure 5:
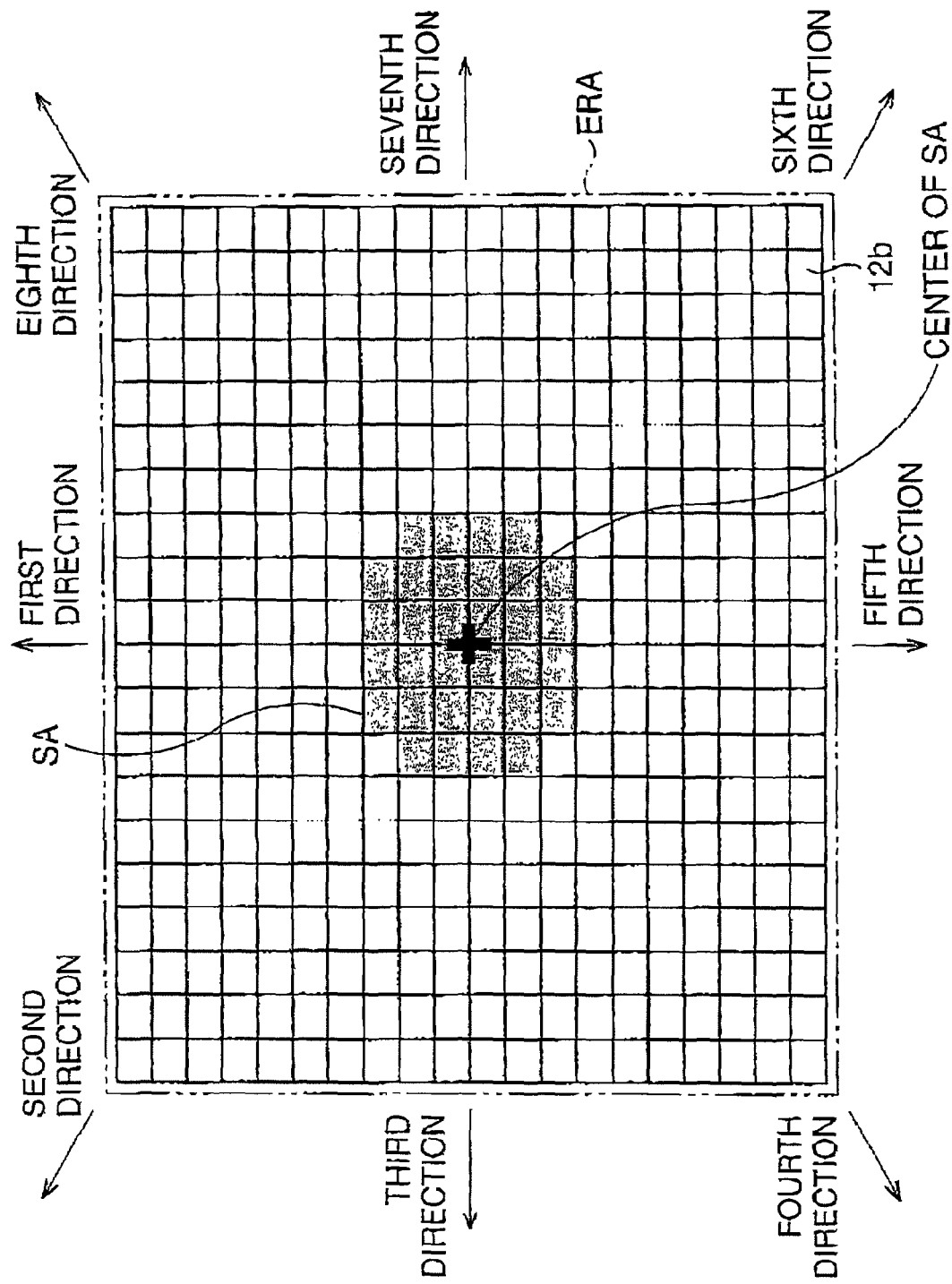
FIG. 5 shows the light-receiving surface for explaining the form of the scanning area comprising pixel blocks.

As shown by the shaded area at the center of FIG. 5, the SA comprises the 32 pixel blocks 12b arranged in a cross-shaped rectangular formation comprised of 6 rows and 6 columns with the four corner pixel blocks having been removed.

Incidentally, the pixel block 12b on the ERA are separated from each other by borderlines formed by a plurality of vertical and horizontal lines demarcating the columns and rows created from partitioning the ERA. One of the many intersection points formed by the crosshairs of intersecting vertical and horizontal borderlines can be decided upon as the center of the SA, and the location of the initial SA is designated from the location of the center of the SA. The location of the SA is designated based on the operational command which is input to the input block 14.

Data corresponding to the initially designated SA is sent to the second setting block 33. The second setting block 33 designates eight candidate areas which are of the same size as the current SA, but whose locations are different and determined by displacing the current SA by the same magnitude, but in eight different directions.

The first~eighth detailed directions are predetermined as the eight different directions in which to displace the SA to designate the candidate areas. The upper, upper left, left, lower left, lower, lower right, right, and upper right directions are predetermined as the first, second, third, fourth, fifth, sixth, seventh, and eighth detailed directions, respectively, as shown in FIG. 5.

Figure 6:
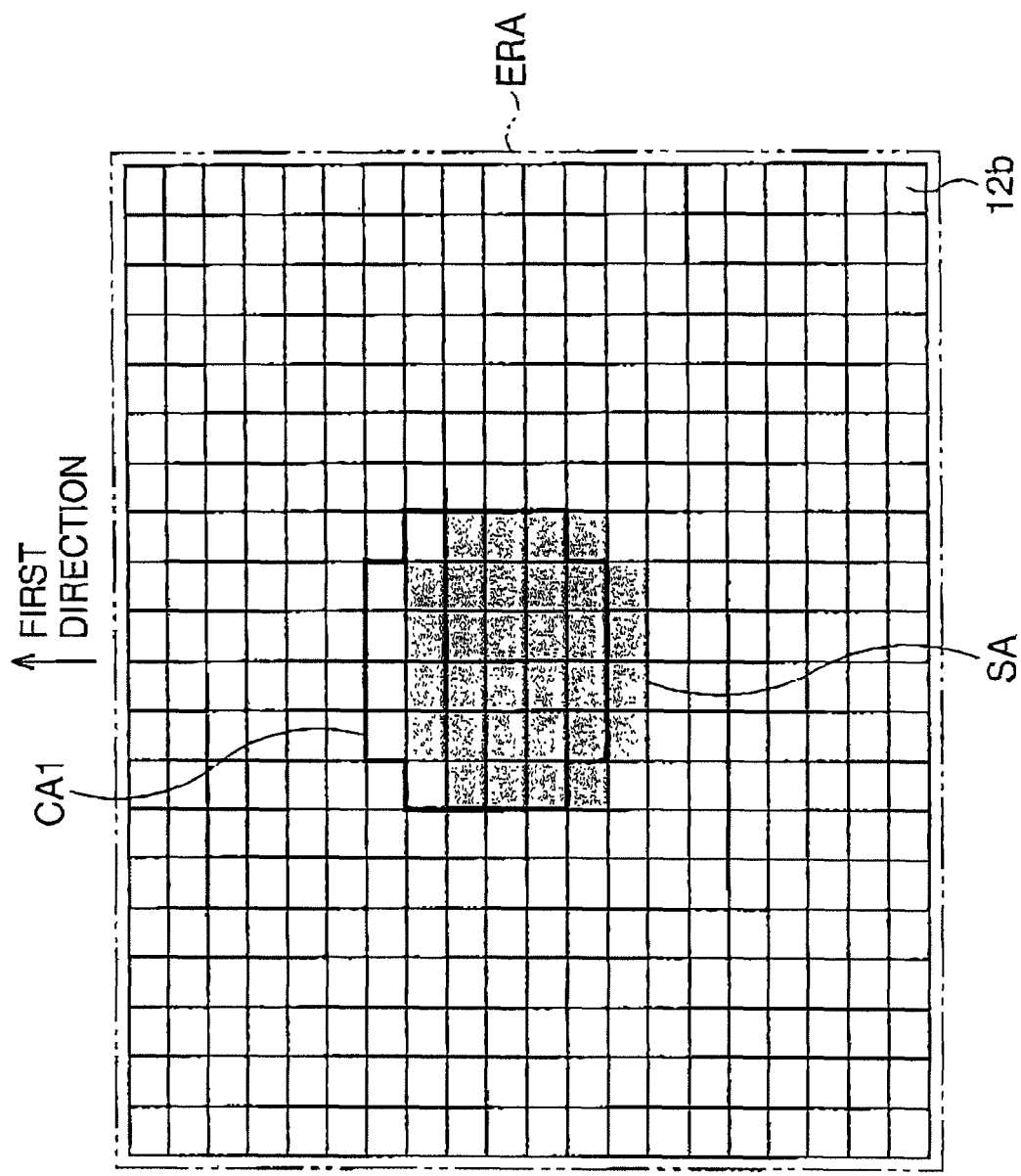
FIG. 6 shows a location of the CA1 relative to the SA.
Figure 7:
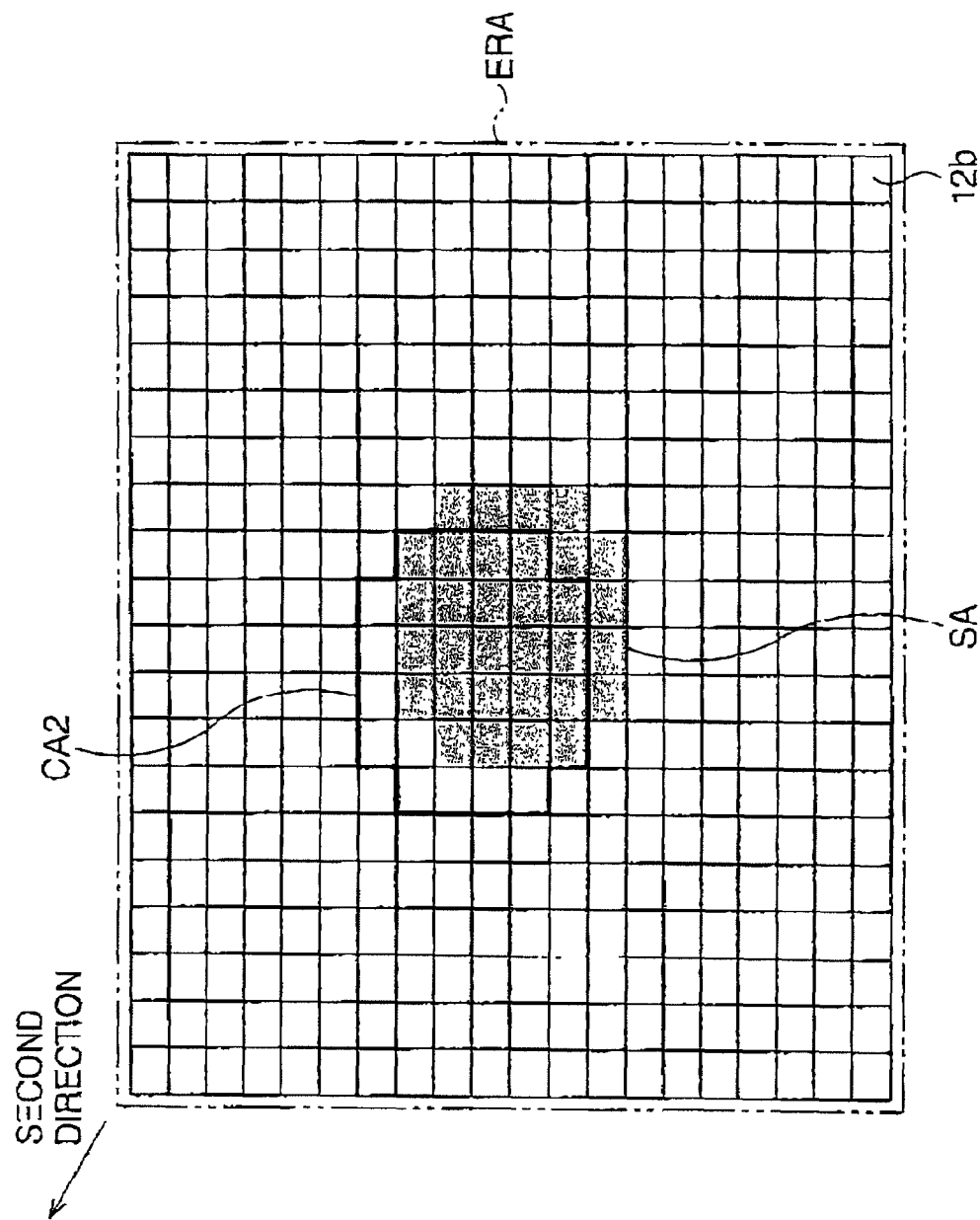
FIG. 7 shows a location of the CA2 relative to the SA.
Figure 8:
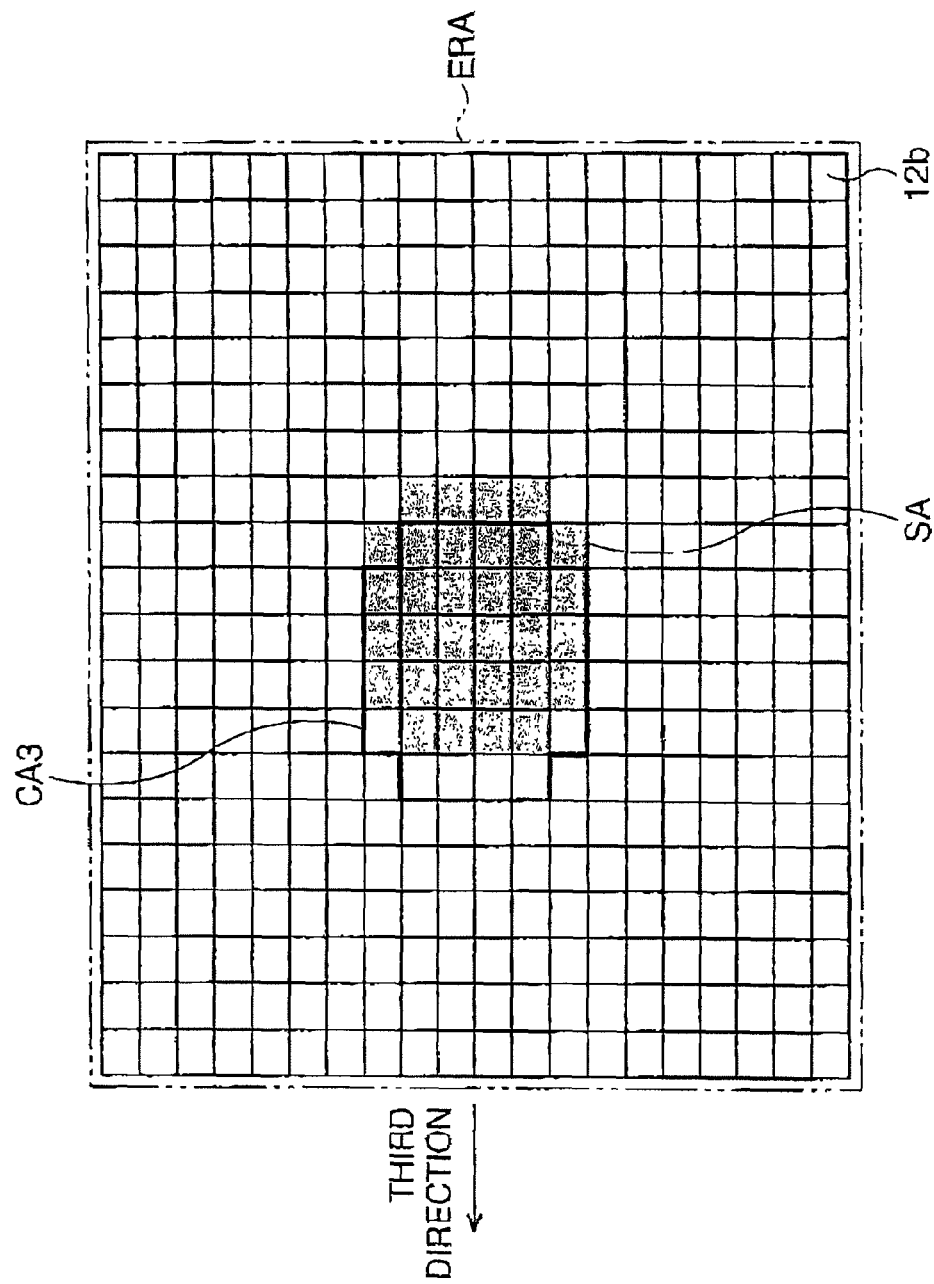
FIG. 8 shows a location of the CA3 relative to the SA.
Figure 9:
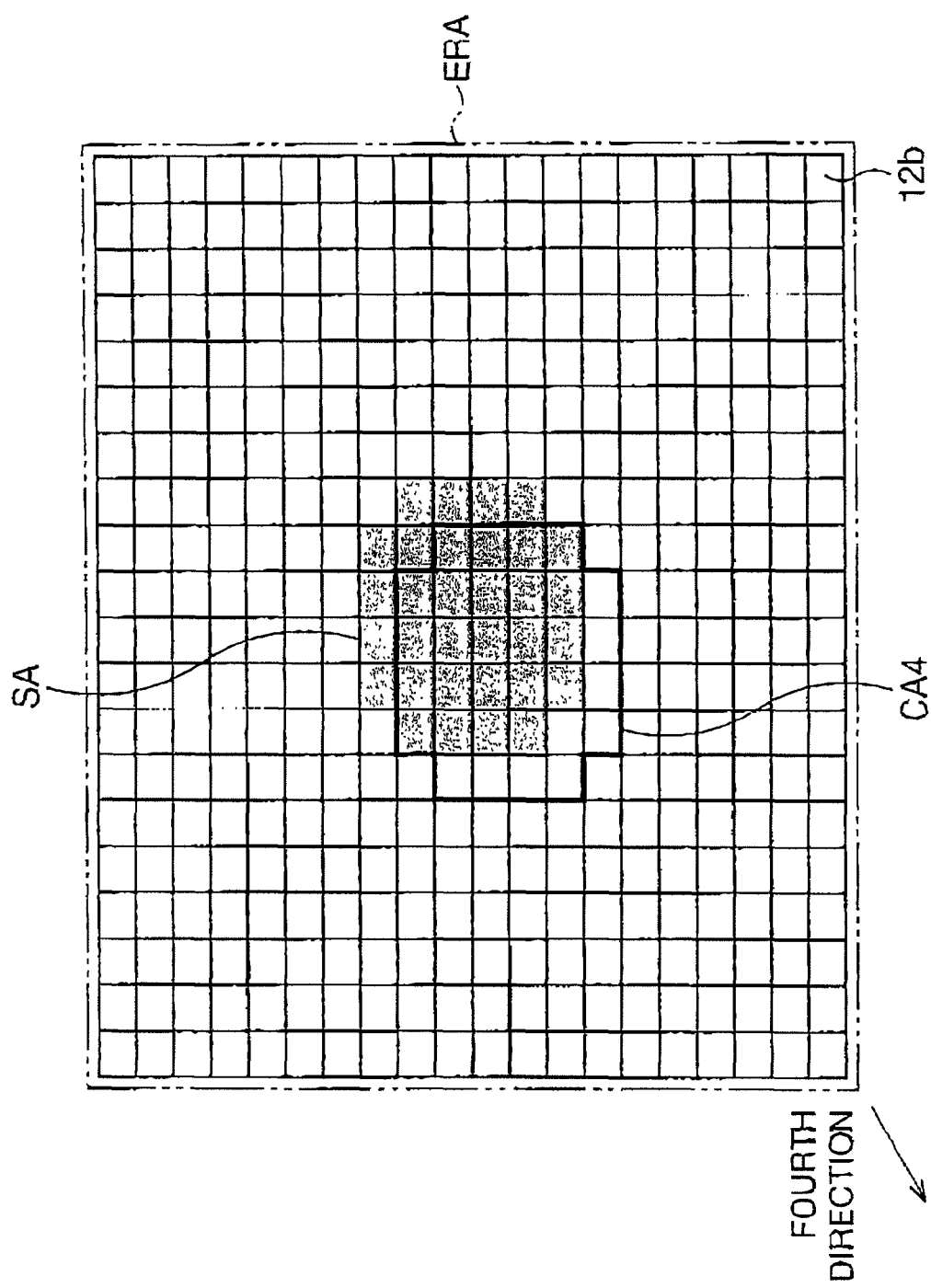
FIG. 9 shows a location of the CA4 relative to the SA.
Figure 10:
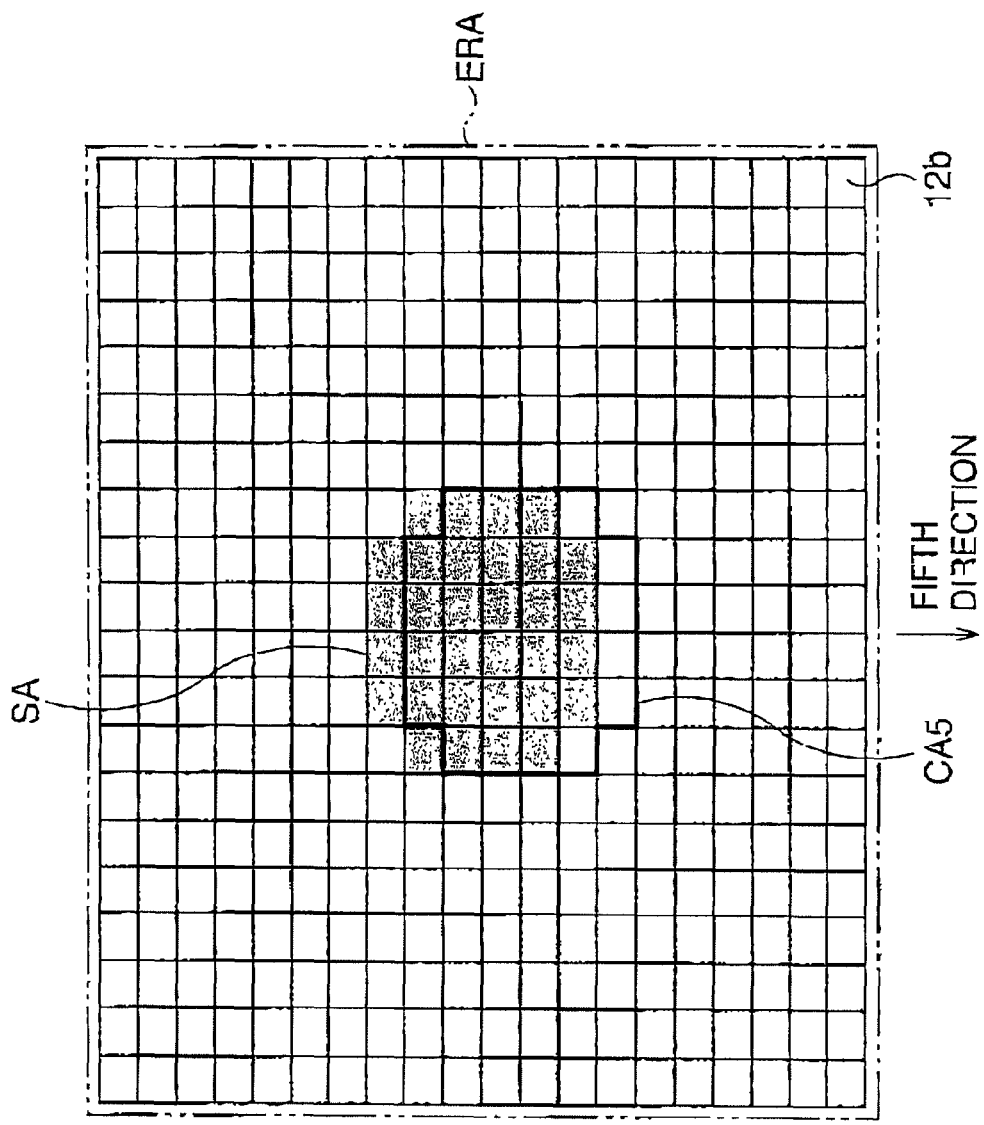
FIG. 10 shows a location of the CA5 relative to the SA.
Figure 11:
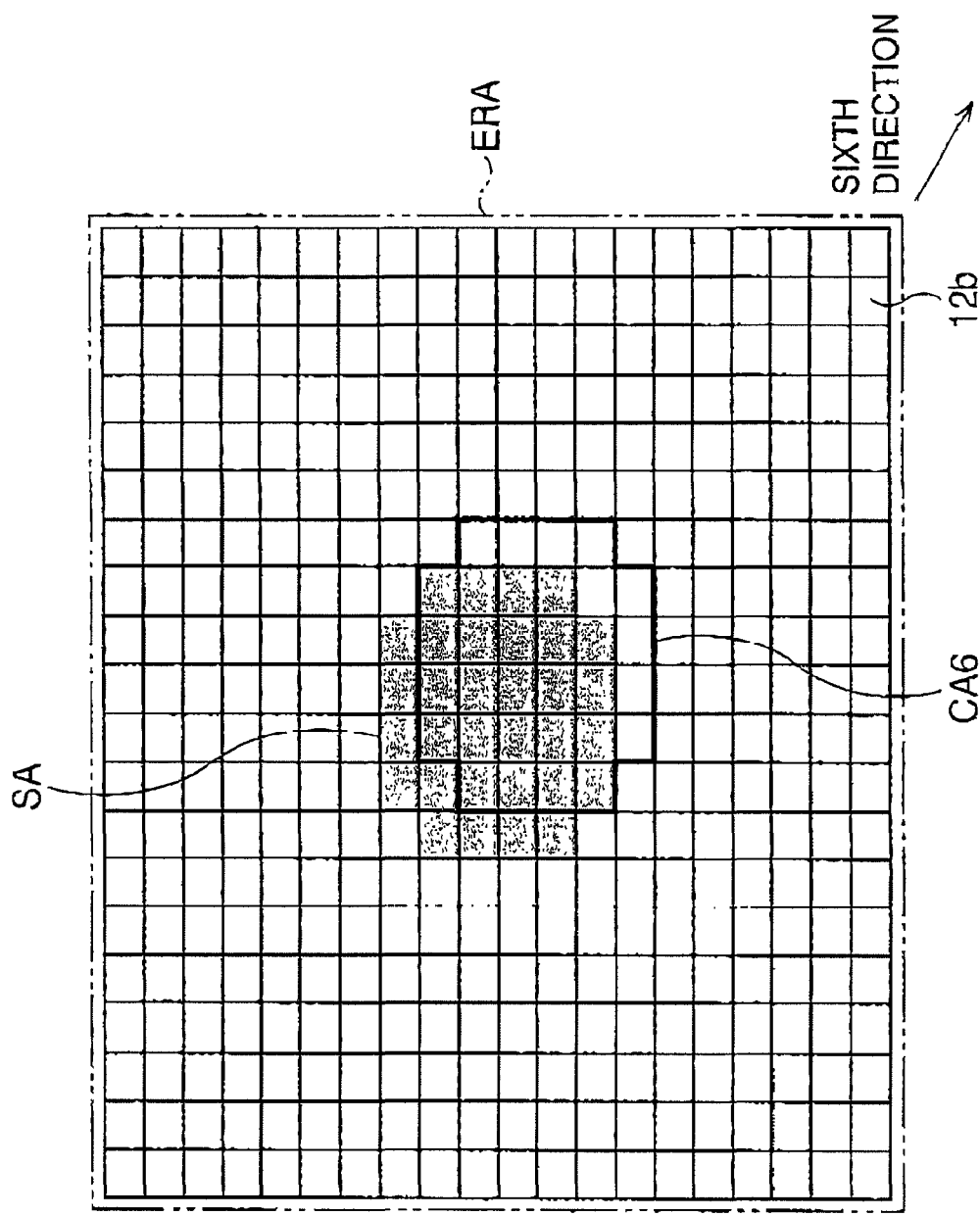
FIG. 11 shows a location of the CA6 relative to the SA.
Figure 12:
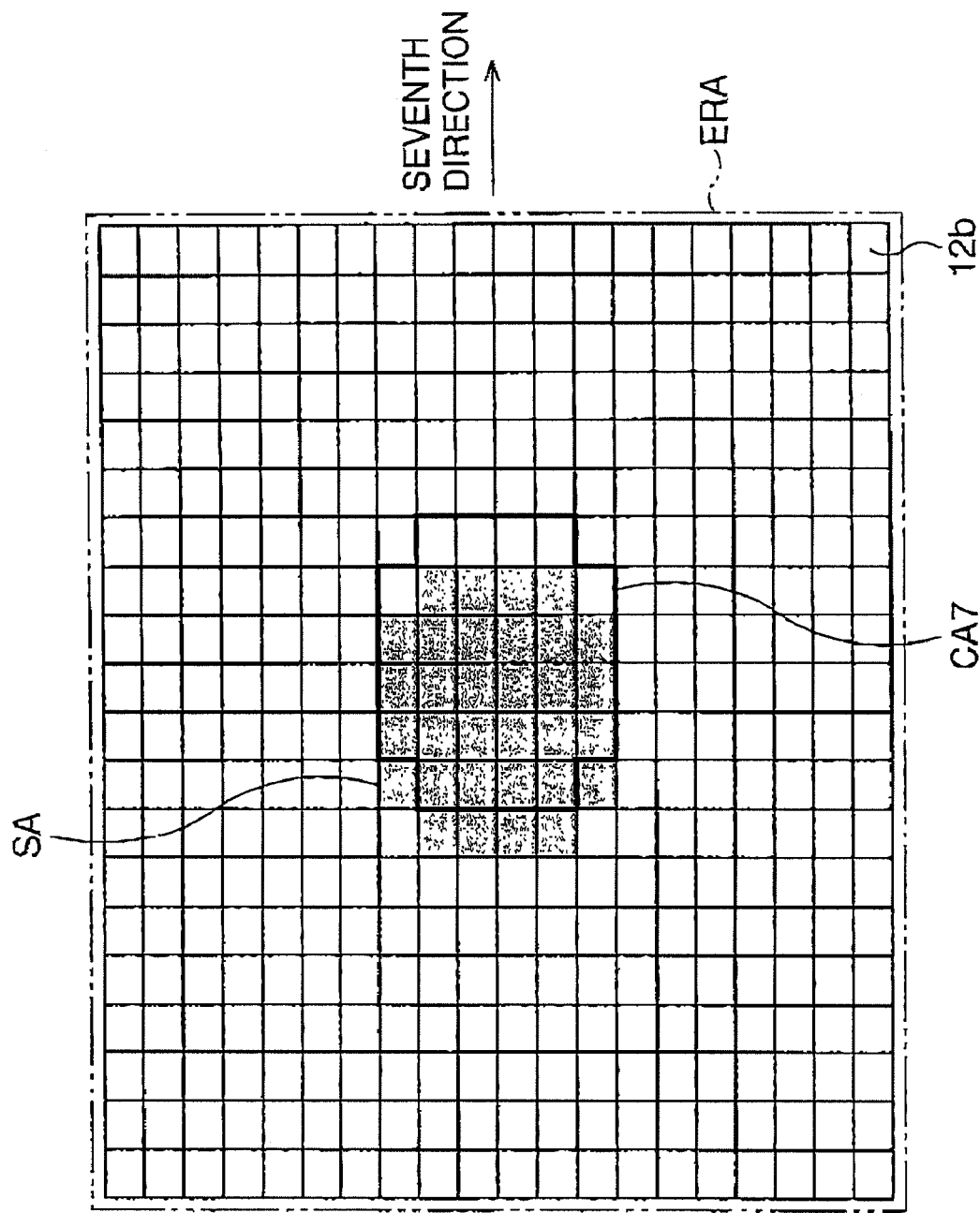
FIG. 12 shows a location of the CA7 relative to the SA.
Figure 13:
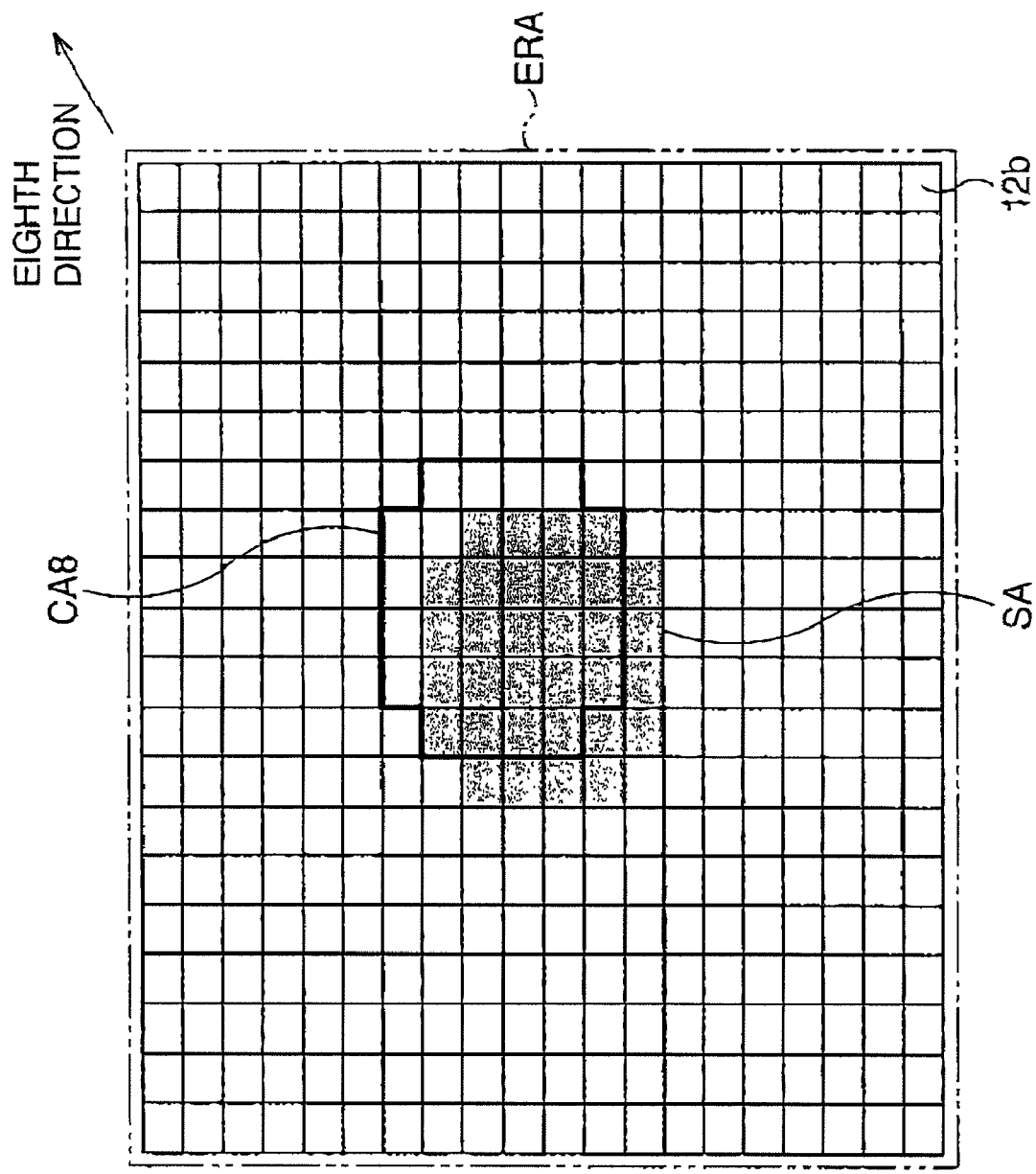
FIG. 13 shows a location of the CA8 relative to the SA.

A candidate area displaced through one pixel block 12b from the SA in the first detailed direction is designated to be the first candidate area, hereinafter referred to as CA1, shown in FIG. 6. A candidate area displaced through one pixel block 12b from the SA in the second detailed direction is designated to be the second candidate area, hereinafter referred to as CA2, shown in FIG. 7. A candidate area displaced through one pixel block 12b from the SA in the third detailed direction is designated to be the third candidate area, hereinafter referred to as CA3, shown in FIG. 8. A candidate area displaced through one pixel block 12b from the SA in the fourth detailed direction is designated to be the fourth candidate area, hereinafter referred to as CA4, shown in FIG. 9. A candidate area displaced through one pixel block 12b from the SA in the fifth detailed direction is designated to be the fifth candidate area, hereinafter referred to as CA5, shown in FIG. 10. A candidate area displaced through one pixel block 12b from the SA in the sixth detailed direction is designated to be the sixth candidate area, hereinafter referred to as CA6, shown in FIG. 11. A candidate area displaced through one pixel block 12b from the SA in the seventh detailed direction is designated to be the seventh candidate area, hereinafter referred to as CA7, shown in FIG. 12. A candidate area displaced through one pixel block 12b from the SA in the eighth detailed direction is designated to be the eighth candidate area, hereinafter referred to as CA8, shown in FIG. 13.

Data corresponding to the designated CA1~CA8 is sent to the recognition block 34. In addition, data corresponding to the SA initially designated by the first setting block 32 is also sent to the recognition block 34, and the image data is sent to the recognition block 34 from the AFE 13.

The recognition block 34 extracts image data components corresponding to the SA and the CA1~CA8 from each frame of the image data. Incidentally, the image data components correspond to luminance values for the group of pixel blocks 12b comprising the SA or the CA1~CA8.

For example, assuming the image data sent at a first point in time contains the luminance values 120, 30, 60, 55, 70, 110, 100, 70, 40, 105, 40, 85, 95, 65, 25, 40, 150, 120, 60, 30, 25, 45, 100, 120, 110, 95, 80, 50, 90, 75, 80, and 20, from left to right and from top to bottom (see FIG. 14), for the pixel blocks 12b comprising the SA, these luminance values are extracted as the image data component corresponding to the SA at the first point in time.

The luminance values for the pixel blocks 12b of the SA or the CA1~CA8 are converted into binary values, for example 0 or 1, based on the extracted image data components. In the conversion to binary values, an average or the luminance values for the pixel blocks 12b of the SA or the CA1~CA8 is calculated, and each individual luminance value is subsequently compared to the average luminance value. If a luminance value is higher than the average luminance value, the luminance value is converted to 1. If a luminance value is lower than the average luminance value, the luminance value is converted to 0.

For example, the average of the luminance values in the SA shown in FIG. 14 is 73.75. In the conversion to binary values, the luminance value for the pixel blocks 12b of the SA are converted to 1, 0, 0, 0, 0, 1, 1, 0, 0, 1, 0, 1, 1, 0, 0, 0, 1, 1, 0, 0, 0, 0, 1, 1, 1, 1, 1, 0, 1, 1, 1, and 0 from left to right and from top to bottom, respectively (see FIG. 15).

Data corresponding to the binary luminance values of the pixel blocks 12b is sent to the third setting block 35, which infers to which of the CA1~CA8 the target object, which is captured by the SA at the current point in time, is moved to at the time of the subsequent image capture. Incidentally, the inference is carried out based on the binary luminance values of the pixel blocks 12b of the SA at one point in time, and the binary luminance values of the pixel blocks 12b of the CA1~CA8 at a subsequent point in time.

One candidate area is selected from the CA1~CA8 based on the calculations of the first~eighth likeness values, a first determination, and a second determination, as described in detail below.

The first~eighth likeness values are calculated values that indicate how similar the image captured in the SA is to the images captured in the CA1~CA8 at the time of the subsequent image capture. To calculate each likeness value, two binary luminance values for pixel blocks 12b, at the relatively same location in both the SA and the CA1~CA8, are compared to each other and it is determined whether or not they are equal to each other. The likeness value is the number of combinations of compared binary luminance values that are unequal. Accordingly, the lower the likeness value, the greater the similarity inferred between the images captured at the SA and the candidate area.

The third setting block 35 comprises an exclusive- or circuit (not depicted). The binary luminance values of the pixel blocks 12b at the relatively same location of the SA and the CA1 are input to the exclusive- or circuit. When the binary luminance values of the pixel blocks 12b at the relatively same location of the SA and the CA1 are equal to each other, the exclusive- or circuit outputs 0. On the other hand, when the binary luminance values of the pixel blocks 12b at the relatively same location of the SA and the CA1 are unequal to each other, the exclusive- or circuit outputs 1.

For example, the binary luminance values for the pixel blocks 12b in the CA1 are 0, 0, 0, 1, 1, 1, 1, 1, 0, 0, 1, 1, 1, 0, 0, 1, 1, 0, 0, 1, 0, 0, 1, 1, 0, 1, 1, 0, 0, 1, 1, and 0 from left to right and from top to bottom, respectively, as shown in FIG. 16. When the binary luminance values for the pixel blocks 12b of the SA and the CA1 in the top row and leftmost column are input to the exclusive- or circuit, the exclusive- or circuit outputs 1. Similarly, when the binary luminance value for the pixel blocks 12b of the SA and the CA1 in the top row and second leftmost column are input to the exclusive- or circuit, the exclusive- or circuit outputs 0. Hereinafter, similarly, when the combinations of the luminance values of the pixel blocks 12b of the SA and the CA1 at the relatively same locations are input to the exclusive- or circuit from left to right and from top to bottom, the exclusive- or circuit outputs 1, 0, 0, 1, 1, 0, 0, 1, 0, 1, 1, 0, 0, 0, 0, 1, 0, 1, 0, 1, 0, 0, 0, 0, 1, 0, 0, 0, 1, 0, 0, and 0, respectively. The number of times the exclusive- or circuit outputs 1 is counted and saved as a first likeness value, hereinafter referred to as U(exor).

Similarly, the SA and the CA2 are compared to each other, and the second likeness value, hereinafter referred to as UL(exor), is calculated. Similarly, the SA and the CA3 are compared to each other, and the third likeness value, hereinafter referred to as L(exor), is calculated. Similarly, the SA and the CA4 are compared to each other, and the fourth likeness value, hereinafter referred to as DL(exor), is calculated. Similarly, the SA and the CA5 are compared to each other, and the fifth likeness value, hereinafter referred to as D(exor), is calculated. Similarly, the SA and the CA6 are compared to each other, and the sixth likeness value, hereinafter referred to as DR(exor), is calculated. Similarly, the SA and the CA7 are compared to each other, and the seventh likeness value, hereinafter referred to as R(exor), is calculated. Similarly, the SA and the CA8 are compared to each other, and the eighth likeness value, hereinafter referred to as UR(exor), is calculated.

After calculation of the U(exor), UL(exor), L(exor), DL(exor), D(exor), DR(exor), R(exor), and UR(exor), the third setting block 35 carries out a first determination.

In the first determination, the general direction where the targeted object has moved is roughly determined to be either a first, second, third, or fourth general direction. Incidentally, the first, second, third, and fourth general directions are the first, third, fifth, and seventh detailed directions, respectively.

To determine a general direction in which the targeted object has moved, a first, second, third, and fourth general likeness value, hereinafter referred to as UU, LL, DD, and RR, respectively, are calculated. The UU is calculated by summing up the U(exor), UL(exor), and UR(exor). Similarly, the LL is calculated by summing up the UL(exor), L(exor), and DL(exor). Similarly, the DD is calculated by summing up the DL(exor), D(exor), and DR(exor). Similarly, the RR is calculated by summing up the DR(exor), R(exor), and UR(exor).

The third setting block 35 determines the lowest general likeness value among the UU, LL, DD, and RR, which corresponds to the general direction that is then determined to be the general direction where the targeted object has moved.

The third setting block carries out a second determination subsequent to the first determination. In the second determination, the third setting block 35 determines the detailed direction in which the targeted object has moved, based on the detailed directions which include the positive component of the general direction from the first determination. For example, when the UU is the lowest, the detailed direction where the targeted object has moved is determined from the first, second, and eighth detailed directions. When the LL is the lowest, the detailed direction where the targeted object is moved is determined from the second, third, and fourth detailed directions. When the DD is the lowest, the detailed direction where the targeted object is moved is determined from the fourth, fifth, and sixth detailed directions. When the RR is the lowest, the detailed direction where the targeted object is moved is determined from the sixth, seventh, and eighth detailed directions.

In the second determination, the lowest likeness value is determined from the three likeness values corresponding to three detailed directions which include the positive component of the determined general direction. The candidate area of which likeness value is the lowest is determined and selected by the third setting block 35 as the area where the target object moved from the scanning area. The selected candidate area is re-designated as a new scanning area.

Incidentally, when the normal auto focus function is carried out, only the first setting block 32 in the pursuit block 30 is functional while the luminance calculation block 31, the second setting block 33, the recognition block 34, and the third setting block 35 are suspended.

Data corresponding to the SA initially designated by the first setting block 32 is sent to the AF adjustment block 23*a* through the recognition block 34 and the third setting block 35. Incidentally, the initially designated SA remains the SA, dissimilar to the pursuit auto focus function.

Figure 17:
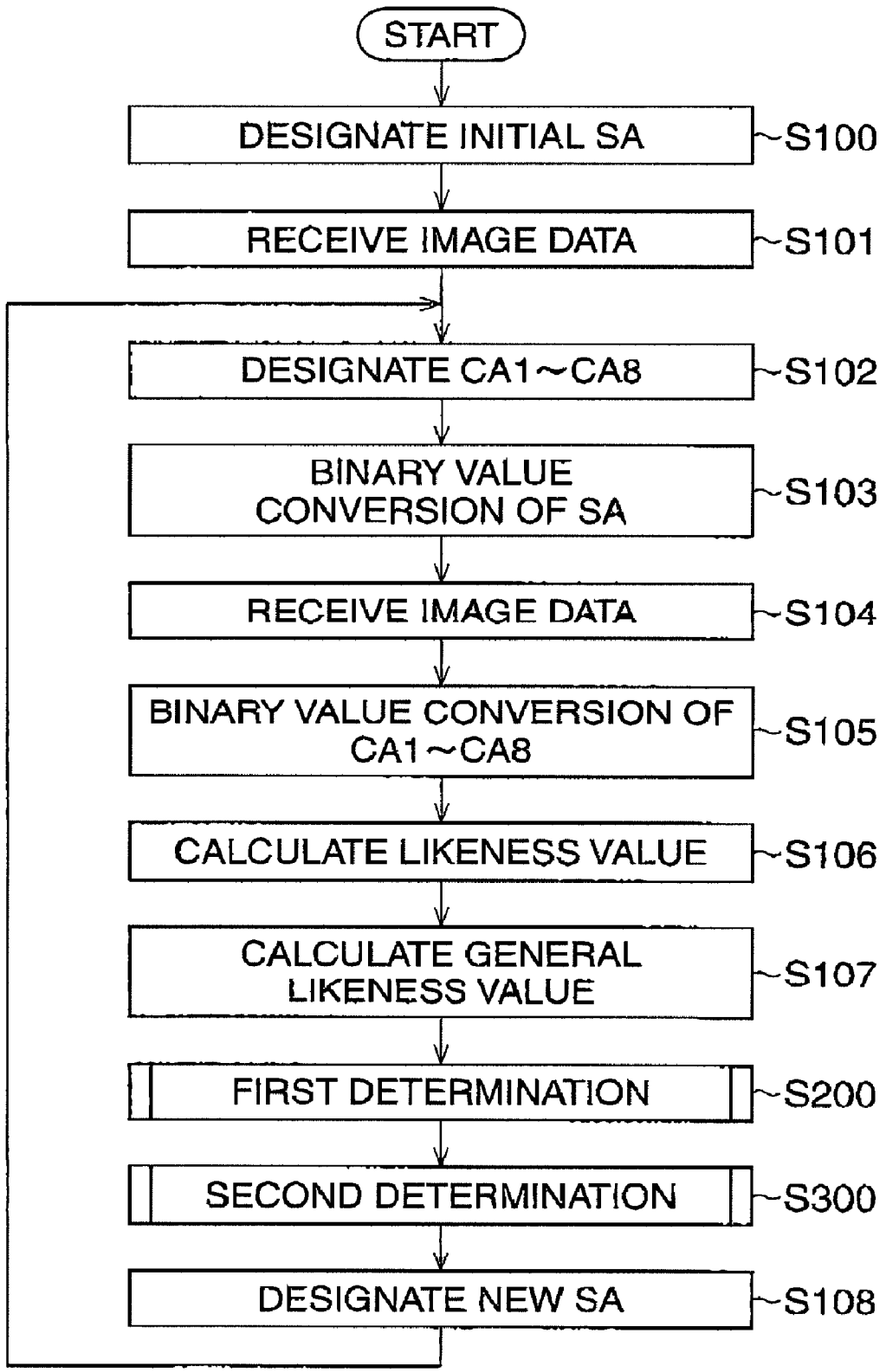
FIG. 17 is a flowchart explaining the scanning area designation process carried out by the pursuit block.
Figure 18:
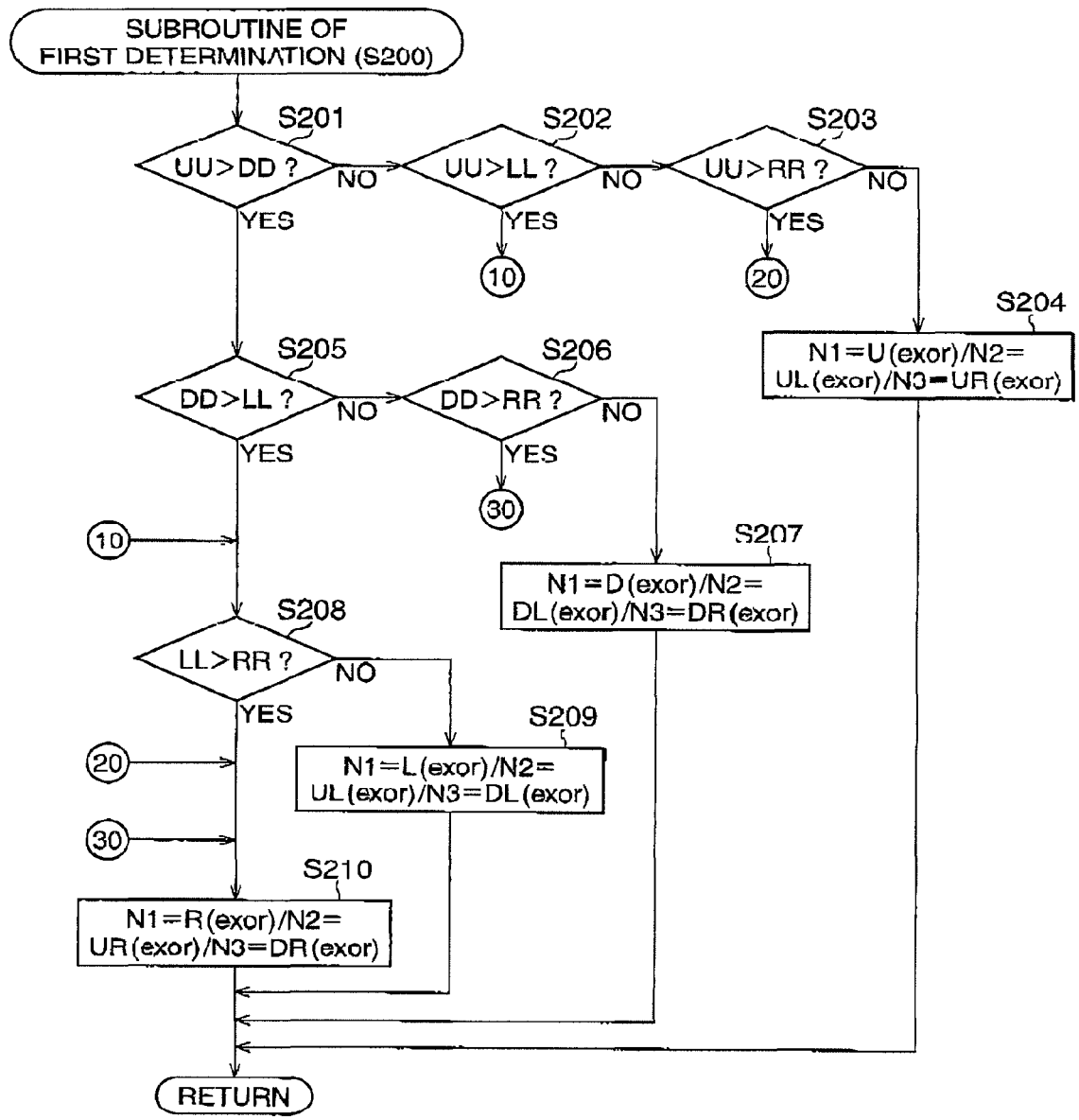
FIG. 18 is a flowchart explaining the first determination process carried out by the pursuit block.
Figure 19:
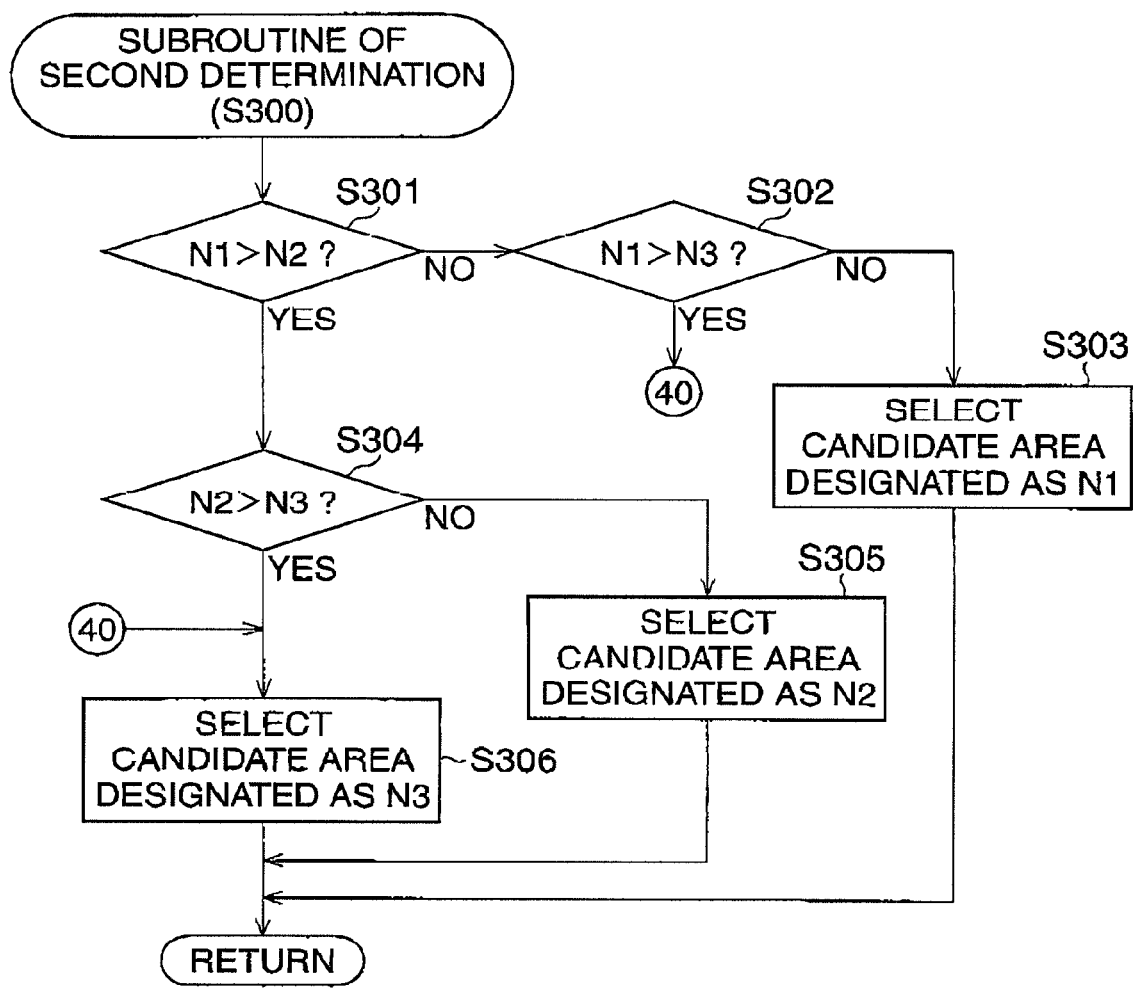
FIG. 19 is a flowchart explaining the second determination process carried out by the pursuit block.

Next, the process for designation of the scanning area carried out by the pursuit block 30 is explained using the flowchart of FIGS. 17~19.

The process for designation of the scanning area starts when the release button is depressed halfway, effectively switching on the pursuit auto focus function. Incidentally, the process for designation of the scanning area is repeated until the power button is switched off or the pursuit auto focus function is switched off.

At step S100, the SA is designated initially. The SA is designated so that the center of the SA is one point which is decided according to a user's command input. At step S101 subsequent to step S100, one frame of image data is received. After receiving the image data, the process proceeds to step S102.

At step S102, the CA1~CA8 are designated based on the designated SA. At step S103 subsequent to step S102, data components corresponding to the SA are extracted from the latest received image data. In addition, the luminance values of the pixel blocks 12*b* in the SA are converted into binary values.

After conversion to binary values, the process proceeds to step S104, where the pursuit block 30 receives a frame of image data generated subsequent to the image data used for extraction of the SA.

At step S105 subsequent to step S104, data components corresponding to the CA1~CA8 are extracted from the image data received at step S104. In addition, the luminance values of the pixel blocks 12*b* in the CA1~CA8 are converted into binary values.

After conversion to binary values, the process proceeds to step S106, where the U(exor), UL(exor), L(exor), DL(exor), D(exor), DR(exor), R(exor), and UR(exor) are calculated based on the binary luminance values in the SA and the CA1~CA8.

At step S107 subsequent to step S106, the UU, LL, DD, and RR are calculated using the U(exor), UL(exor), L(exor), DL(exor), D(exor), DR(exor), R(exor), and UR(exor) calculated at step S106.

At step S200, three likeness values are selected for the second determination by carrying out a subroutine of the first determination, as described in detail later. After finishing the subroutine of the first determination, the process proceeds to step S300, where a subroutine of the second determination is carried out. One candidate area that captures an image that the SA previously captured is selected from the CA1~CA8 by carrying out the subroutine of the second determination.

At step S108 after the second subroutine, the candidate area selected at step S300 is designated to be the new SA and the process then returns to step S102. Since then, steps S102~108 are repeated.

Next, the subroutines of the first and second determinations carried out at steps S200 and S300, respectively, are explained.

When the subroutine of the first determination commences, it is determined whether the UU or DD is lower at step S201. When the UU is lower than the DD, the process proceeds to step S202. At step S202, it is determined whether the UU or LL is lower. When the UU is lower than the LL, the process proceeds to step S203. At step S203, it is determined whether the UU or RR is lower. When the UU is lower than the RR, the process proceeds to step S204.

At step S204, the first general direction, which is equal to the first detailed direction, is determined to be the general direction in which the targeted object has moved. The U(exor), UL(exor), and UR(exor) are then selected for the second determination. The U(exor) is designated as a first determination number, hereinafter referred to as N1. The UL(exor) is designated as a second determination number, hereinafter referred to as N2. The UR(exor) is designated as a third determination number, hereinafter referred to as N3.

When the DD is determined to be lower than the UU at step S201, the process proceeds to step S205. At step S205, it is determined whether the DD or LL is lower. When the DD is lower, the process proceeds to step S206. At step S206, it is determined whether the DD or RR is lower. When the DD is lower, the process proceeds to step S207.

At step S207, the third general direction, which is equal to the fifth detailed direction, is determined to be the general direction in which the targeted object has moved. The DL(exor), D(exor), and DR(exor) are then selected for the second determination, with D (exor) designated as N1, DL (exor) designated as N2, and DR(exor) designated as N3.

When the LL is determined to be lower at steps S202 or S205, the process proceeds to step S208. At step S208, it is determined whether the LL or RR is lower. When the LL is lower, the process proceeds to step S209.

At step S209, the second general direction, which is equal to the third detailed direction, is determined to be the general direction in which the targeted object has moved. The UL(exor), L(exor), and DL(exor) are then selected for the second determination, with L(exor) designated as N1, UL(exor) designated as N2, and DL(exor) designated as N3.

When the RR is determined to be lower at step S203, 206, or S208, the process proceeds to step S210.

At step S210, the fourth general direction, which is equal to the seventh detailed direction, is determined to be the general direction in which the targeted object has moved. The DR(exor), R(exor), and UR(exor) are then selected for the second determination, with R(exor) designated as N1, UR(exor) designated as N2, and DR(exor) designated as N3.

The subroutine of the first determination is complete after step S204, S207, or S209; the subroutine of the second determination then commences at step S300.

When the subroutine of the second determination commences, it is determined whether N1 or N2 is lower at step S301; when N1 is lower, the process proceeds to step S302.

At step 302, it is determined whether N1 or N3 is lower; when N1 is lower, the process proceeds to step S303.

At step S303, the detailed direction corresponding to the likeness value designated as N1 is determined to be the detailed direction in which the targeted object has moved. The candidate area corresponding to the determined detailed direction is selected for designation of the new scanning area at step S108.

When N2 is lower at step S301, the process proceeds to step S304. At step S304, it is determined whether the N2 or N3 is lower; when N2 is lower, the process proceeds to step S305.

At step S305, the detailed direction corresponding to the likeness value designated as N2 is determined to be the detailed direction in which the targeted object has moved. The candidate area corresponding to the determined detailed direction is selected for designation of the new scanning area at step S108.

When N3 is lower at either step S302 or S304, the process proceeds to step S306.

At step S306, the detailed direction corresponding to the likeness value designated as N3 is determined to be the detailed direction in which the targeted object has moved. The candidate area corresponding to the determined detailed direction is selected for designation of the new scanning area at step S108.

The subroutine of the second determination is complete after step S303, S305, or S306; the process then proceeds to step S108.

In the prior pattern matching method, the U(exor), UL(exor), L(exor), DL(exor), D(exor), DR(exor), R(exor), and UR(exor) in the above embodiment are directly compared to each other, and the candidate area corresponding to the lowest likeness value is designated to be the area corresponding to the targeted object. However, as described above, spurious pursuit may occur because the likeness value corresponding to the candidate area where the targeted object has not actually moved may be the lowest likeness value.

On the other hand, some candidate areas are screened by roughly determining the general direction in which the targeted object has moved based on the first~fourth general directions calculated using U(exor), UL(exor), L(exor), DL(exor), D(exor), DR(exor), R(exor), and UR(exor) in the above embodiment. Even if the likeness value corresponding to the candidate area where the targeted object has not actually moved happens to be the lowest among the eight candidate areas, the general likeness value corresponding to the general direction where the targeted object has actually moved will be probably lowest. Accordingly, the capability exists to mitigate spurious pursuit and to improve the accuracy of the pursuit of the targeted object by determination of detailed directions after determination of general directions.

The detailed direction in which the targeted object has moved is determined from the first~eighth detailed directions in the above embodiment. However, one detailed direction may be determined from as few as four or more detailed directions. For example, in the situation where one detailed direction is determined from four detailed directions, each detailed direction is separated from each adjacent direction by an angle of 90 degrees so that there are 90 degrees between neighboring directions and 180 degrees between opposing directions. For the first determination, two general directions are predetermined with the first general direction being synthesized from the coordinates of the two neighboring detailed directions, and the second general direction being 180 degrees from (opposite to) the first general direction. The second determination may then be carried out to determining in which detailed direction the targeted object has moved by selecting a detailed direction from one of the two general directions.

The general direction in which the targeted object has moved is determined from the first~fourth general directions in the above embodiment. However, one general direction may be determined from as few as two or more general directions.

The general likeness value is calculated using three likeness value corresponding to three different detailed directions in the above embodiment. However, the general likeness value may be calculated from as few as two or more likeness values corresponding to as few as two or more detailed directions as long as the two detailed directions include a positive component of the general direction and are different from each other. In the second determination of the above case, the detailed direction in which the targeted object has moved is determined from the number of the detailed directions corresponding to the likeness values used for the calculation of the general likeness values determined in the first determination.

One pixel block 12b corresponds to the magnitude of displacement from the SA to the CA1~CA8 in the above embodiment. However, any number of pixel blocks 12b can correspond to the magnitude of displacement. In addition, the number of pixel block 12b corresponding to the magnitude of displacement may be different according to the direction of movement. However, it is preferable for the magnitude of displacement to be substantially the same, regardless of the direction of movement.

The SA and the CA1~CA8 is in the shape of a cross in the above embodiment, however, any shape can be adaptable.

The luminance values of the pixel blocks 12b comprising the SA and the CA1~CA8 are converted into binary values in the above embodiment. However, the luminance values can be converted into any number of different levels, or such conversions need not be carried out at all. It should be noted that the first and second determinations can be carried out quickly upon conversion to binary values. Incidentally, the influence of flicker, such as fluorescent light, can be lowered by normalizing the luminance values of the pixel blocks in the SA and CA1~CA8 using the average luminance value of each area.

It is determined whether or not the binary luminance values of the pixel block 12b comprised in the SA and CA1~CA8 accord to each other using the exclusive- or circuit, in the above embodiment. Another arithmetical circuit, such as an exclusive -nor circuit, can be used for the purpose of this determination.

The position of the focus lens when an object is in focus is determined according to the contrast detection method in the above embodiment. However, the position of the focus lens may be determined according to another method, such as the phase difference detection method.

The pixels are arranged in a matrix within the ERA, in the above embodiment. However, the arrangement of pixels is not restricted to a matrix and can be arranged in any two-dimensional pattern.

The auto focus functions are carried out for the targeted object pursued by the pursuit block 30 in the above embodiment. However, the pursuit function utilized by the pursuit block 30 to pursue the movement of the targeted object can be adapted to another function. For example, a monitoring camera can display a moving targeted object and a mark indicating the targeted object that is adaptable to the monitoring camera. Alternatively, the exposure adjustment can be carried out automatically for a moving targeted object.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-072904 (filed on Mar. 16, 2006), which is expressly incorporated herein, by reference, in its entirety.

The invention claimed is:

1. A targeted object pursuit system that pursues the movement of a targeted object within a plurality of sequentially captured images, said targeted object pursuit system comprising:
   a first setting block that initially designates a partial area of a predetermined location in said captured image as a pursuit area for pursuing said targeted object;
   a second setting block that designates the areas displaced from said pursuit area in a first, second, third, and fourth detailed direction as a first, second, third, and fourth candidate area, respectively, said first and second detailed directions comprising a positive component of a first general direction, said third and fourth detailed directions comprising a positive component of a second general direction, said second general direction being different from said first general direction;
   a recognition block that extracts a standard image corresponding to said pursuit area from said captured image captured at a first point in time, said recognition block extracting a first, second, third, and fourth candidate image corresponding to said first, second, third, and fourth candidate areas, respectively, from said captured image captured at a second point in time which is subsequent to said first point in time;
   a first determination block that determines in which general direction said targeted object moves during the interval between said first and second point in time is said first or second general direction based on likeness values between said standard image and said first, second, third, and fourth candidate image, said likeness values between said standard image and said first, second, third, and fourth candidate image varying according to how much said standard image accords to said first, second, third, and fourth image, respectively;
   a second determination block that determines in which detailed direction said targeted object moves is said first or second detailed direction based on likeness values between said standard image and said first and second candidate image when said general direction where said targeted object moves is determined to be said first general direction by said first determination block, said second determination block determines in which detailed direction said targeted object moves is said third or fourth detailed direction based on likeness values between said standard image and said third and fourth candidate image when said general direction where said targeted object moves is determined to be said second general direction by said first determination block; and
   a re-designation block that re-designates a candidate area that corresponds to the detailed direction which said targeted object moved as determined by said second determination block as said new pursuit area.

2. A targeted object pursuit system according to claim 1, wherein said first determination block calculates said likeness value, said likeness value between said standard image and said first, second, third and fourth image corresponds to first, second, third, and fourth likeness value, and said first determination block determines in which general direction said targeted object moves is said first or second general direction by comparing the sum of said first and second likeness values with the sum of said third and fourth likeness values.

3. A targeted object pursuit system according to claim 1, wherein said second determination block calculates said likeness value, said likeness value between said standard image and said first, second, third and fourth image corresponds to first, second, third, and fourth likeness value, and said second determination block determines in which detailed direction said targeted object moves is either said first or second detailed direction by comparing said first and second likeness values, or is said third or fourth detailed direction by comparing said third and fourth likeness values.

4. A targeted object pursuit system according to claim 1, wherein the distances from said standard area to said first, second, third, and fourth candidate areas are the same.

5. A targeted object pursuit system according to claim 1, wherein,
   said second setting block designates the areas moved from said pursuit area in a fifth and sixth detailed direction as a fifth and sixth candidate area, respectively, said fifth and sixth detailed directions comprising a positive component of a third general direction being different from said first and second general directions,
   said recognition block extracts a fifth and sixth candidate image corresponding to said fifth and sixth candidate areas, respectively, from said captured image captured at said second point in time;
   said first determination block determines in which general direction said targeted object moves during the interval between said first and second point in time is said first, second, or third general direction based on likeness values between said standard image and said first, second, third, fourth, fifth, and sixth candidate images, said likeness values between said standard image and said fifth and sixth candidate images varying according to how much said standard image accords to said fifth and sixth images, respectively; and
   a second determination block determines in which detailed direction said targeted object moves is said fifth or sixth detailed direction based on likeness values between said standard image and said fifth and sixth candidate images, respectively, when said general direction in which said targeted object moves is determined by said first determination block to be said third general direction.

6. A targeted object pursuit system according to claim 5, wherein,
   said first and third general directions are opposite to from other, said first and second general directions being perpendicular to each other, said first general direction being the same as said first detailed direction, said second general direction being the same as said third detailed direction, said third general direction being the same as said fifth detailed direction, said second detailed direction comprising a positive component of said second general direction, said fourth detailed direction comprising a positive component of said third general direction,
   said second setting block designates the areas moved from said pursuit area in a seventh and eighth detailed direction as a seventh and eighth candidate area, respectively, said seventh detailed direction being opposite to said third detailed direction, said eighth detailed direction comprising positive components of said first and seventh detailed directions;

said recognition block extracts a seventh and eighth candidate image corresponding to said seventh and eighth candidate areas, respectively, from said captured image captured at said second point in time;

said first determination block determines in which direction said targeted object moves during the interval between said first and second point in time is said first, third, fifth, or seventh detailed direction based on likeness values between said standard image and said first, second, third, fourth, fifth, sixth, seventh, and eighth candidate images, said likeness values between said standard image and said seventh and eighth candidate images varying according to how much said standard image accords to said seventh and eighth images, respectively; and a second determination block determines in which detailed direction said targeted object moves is said first, second, or eighth detailed direction based on likeness values between said standard image and said first, second, and eighth candidate images when the direction in which said targeted object moves is determined to be said first detailed direction by said first determination block, said second determination block determining in which detailed direction said targeted object moves is said second, third, or fourth detailed direction based on likeness values between said standard image and said second, third, and fourth candidate images when the direction in which said targeted object moves is determined by said first determination block to be said third detailed direction, said second determination block determining in which detailed direction said targeted object moved is said fourth, fifth, or sixth detailed direction based on likeness values between said standard image and said fourth, fifth, and sixth candidate images, respectively, when the direction in which said targeted object moves is determined by said first determination block to be said fifth detailed direction, said second determination block determining in which detailed direction said targeted object moves is said sixth, seventh, or eighth detailed direction based on likeness values between said standard image and said sixth, seventh, and eighth candidate images, respectively, when the direction in which said targeted object moves is determined by said first determination block to be said seventh detailed direction.

\* \* \* \* \*